US008451815B2

(12) United States Patent
Driesen et al.

(10) Patent No.: US 8,451,815 B2
(45) Date of Patent: May 28, 2013

(54) METHOD FOR A WIRELESS PERSONAL AREA NETWORK

(75) Inventors: Bas Driesen, Eindhoven (NL); Philip Anthony Jamieson, Dorking (GB)

(73) Assignee: Koninklijke Philips Electronincs N.V., Eindhoven (NL)

( * ) Notice: Subject to any disclaimer, the term of this patent is extended or adjusted under 35 U.S.C. 154(b) by 249 days.

(21) Appl. No.: 12/922,693

(22) PCT Filed: Mar. 11, 2009

(86) PCT No.: PCT/IB2009/051006
§ 371 (c)(1),
(2), (4) Date: Sep. 15, 2010

(87) PCT Pub. No.: WO2009/115941
PCT Pub. Date: Sep. 24, 2009

(65) Prior Publication Data
US 2011/0007727 A1    Jan. 13, 2011

(30) Foreign Application Priority Data

Mar. 18, 2008  (EP) .................................. 08152908

(51) Int. Cl.
*H04W 4/00* (2009.01)
(52) U.S. Cl.
USPC ........................................................ 370/338
(58) Field of Classification Search
USPC ......... 370/203, 204–215, 229–240, 310–337,
370/338–380, 395.1, 395.3, 395.4, 395.41,
370/395.42, 395.5, 395.52, 395.534, 412–421,
370/431–457, 458–463, 464–497, 498–522,
370/523–520, 521–529
See application file for complete search history.

(56) References Cited

U.S. PATENT DOCUMENTS 7,299,042 B2 * 11/2007 Moore et al. .................. 455/434
7,408,907 B2 * 8/2008 Diener .......................... 370/338

(Continued)

FOREIGN PATENT DOCUMENTS

EP    1528717 A1    5/2005

OTHER PUBLICATIONS

Trezentos et al: "Algorithms for Ad-Hoc Piconet Topology Initialization"; IEEE 58th Vehicular Technology Conference, VTC 2003, Oct. 2003, vol. 5, pp. 3448-3452.

*Primary Examiner* — Kwang B. Yao
*Assistant Examiner* — Jung-Jen Liu

(57) ABSTRACT

The present invention relates to a method for a first coordinator operating at a first channel frequency in a wireless personal area network (WPAN), the WPAN further comprising a second coordinator operating a second channel frequency, the method comprising the steps of transmitting a message at a plurality of channel frequencies including the second channel frequency, requesting the second coordinator to change from the second channel frequency to the first channel frequency, and communicating with the second coordinator using the first channel frequency. As discussed above, advantages with the present invention includes that no priority based mechanism is needed due to the fact that the coordinator that initiates (e.g. starts) communication-decides on used frequency. Furthermore, every coordinator is able to have the coordinator it wants to communicate with to change to its decided frequency. The present invention also relates to a corresponding method for a second coordinator, a first and a second coordinator, a system comprising at least a first and a second coordinator, and a corresponding computer program.

14 Claims, 2 Drawing Sheets

U.S. PATENT DOCUMENTS

| | | | |
|---|---|---|---|
| 7,885,174 B2 * | 2/2011 | Welborn et al. | 370/203 |
| 8,031,690 B2 * | 10/2011 | Aiello et al. | 370/348 |
| 8,194,583 B2 * | 6/2012 | Zhu et al. | 370/318 |
| 2004/0047324 A1 * | 3/2004 | Diener | 370/338 |
| 2005/0068930 A1 * | 3/2005 | Choi et al. | 370/343 |
| 2005/0090264 A1 * | 4/2005 | Kim | 455/455 |
| 2007/0076596 A1 | 4/2007 | Roy et al. | |
| 2009/0161728 A1 * | 6/2009 | Nasir et al. | 375/132 |

* cited by examiner

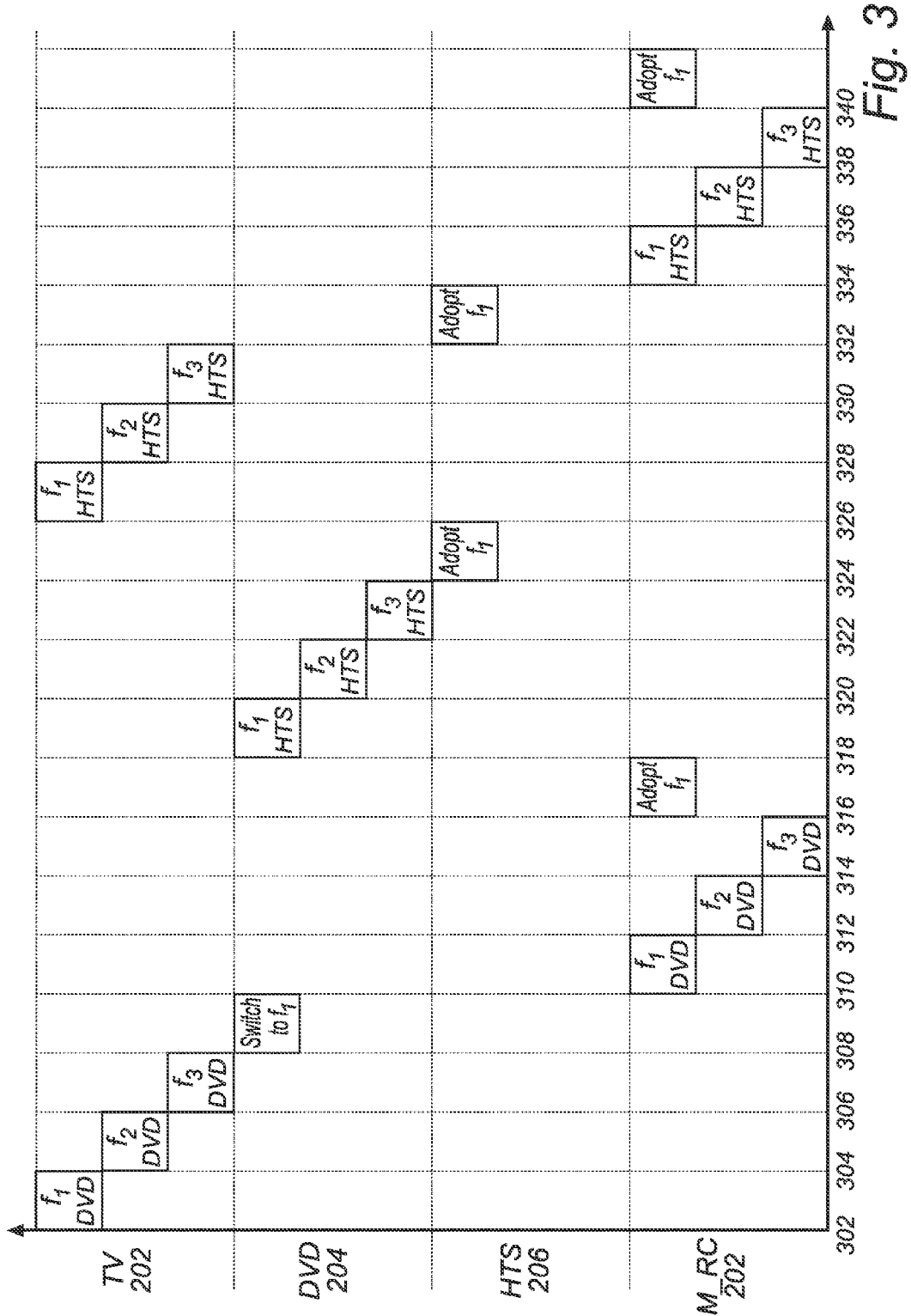

METHOD FOR A WIRELESS PERSONAL AREA NETWORK

FIELD OF THE INVENTION

The present invention relates to a method for a wireless personal area network (WPAN).

DESCRIPTION OF THE RELATED ART

Recently, there has been a seek to increase the cooperation between devices in the home. In line with this increased demand, a number of wireless technologies have been developed, including for example Bluetooth and similar technologies, that typically permits communication within about 10 meters—in other words, a very short range. These short range private networks are commonly denoted as wireless personal area networks (WPANs).

The objective with a WPAN is to facilitate seamless operation among home or business devices and systems, and every device in a WPAN will be able to plug in to any other device in the same WPAN, provided they are within physical range of one another. In the home, WPANs provide cable-free connections for alarms, appliances and entertainment systems.

An example of a suitable network protocol for a WPAN is the IEEE standard 802.15, where for example Bluetooth is included (IEEE 802.15.1), which is suitable for low-power digital radios such as wireless headphones connecting with cell phones via short-range radio. Another example is the ZigBee specification (IEEE 802.15.4), which is targeted towards building automation. The ZigBee technology is intended to be simpler and cheaper than e.g. Bluetooth, and thus target at radio-frequency (RF) applications that require a low data rate, long battery life, and secure networking. A problem with WPAN is however that the current implementation of the network topology is provided as a slave-based non-cooperative networks, where each of the networks can potentially exist on a different channel frequency and therefore will make communication across different networks and more difficult.

EP 1 528 717 tries to solve this by providing an improvement to the cooperation between different wireless devices in a WPAN. A broadcast method is provided for solving problems when a device recognizes that at least two different WPAN communicates on the same channel frequency. The conflict is recognized and a coordinating device, i.e. a coordinator, broadcasts a coordinator realignment command to the devices, instructing to change the currently-used channel to another one. The realignment command comprises change information in a payload field of the synchronous signal, and a predetermined identify bit inserted in the reserved bit of a frame control field of the synchronous signal.

However, even though EP 1 528 717 propose a partial solution to the problem with conflicting WPANs communicating on the same channel frequency, it does not take into account the initialization phase in which a plurality of coordinators are arrange to communicate with each other, and the process for allowing the coordinators to transition to an optimal channel frequency. Instead, EP 1 528 717 solely relies on the prior art slave-based non-cooperative network topology, which introduces extra network traffic due to latency problems.

There is therefore a need for a method for a WPAN, which method takes into account the initialization phase when a plurality of coordinators are arranged to communicate with each other, and which method further provides decreased latency, providing an improved bandwidth and energy efficiency.

SUMMARY OF THE INVENTION

According to an aspect of the invention, the above object is met by a method for a first coordinator operating at a first channel frequency in a wireless personal area network (WPAN), the WPAN further comprising a second coordinator operating a second channel frequency, the method comprising the steps of transmitting a message at a plurality of channel frequencies including the second channel frequency, requesting the second coordinator to change from the second channel frequency to the first channel frequency, and communicating with the second coordinator using the first channel frequency.

In accordance with the present invention, a coordinator is understood to mean a wireless communication device that is capable of setting up a WPAN, e.g. generally a controllable or controlled device which typically is a stationary device connected to the mains. Thus, according to the present invention two such devices are being arranged to "pair" with each other during an initialization phase and transition to the channel frequency of the coordinator that initiated the communication. Conversely, according to prior art, the first coordinator will adopt the channel frequency of the second coordinator, thus leading to the problem of increasing latency and extra network traffic as the coordinators will have to switch back and forth between their preferred channel frequencies.

In addition, the expression "message" should be understood to mean a signal at least partly comprising a defined content intended for requesting the second coordinator to transition to the channel frequency of the first coordinator. Furthermore, the message can be any type of message, for example a specific initialization message (or initialization signal), or included with a general broadcast message.

Advantages with the present invention includes that no priority-based mechanism is needed. This is due to the fact that, as mentioned above, the coordinator that starts communication decides on the used channel frequency, i.e. every coordinator that sets up a communication is able to have the coordinator it wants to communicate with to change to its frequency. Another advantage with the present invention is that it will be possible to easily transmit a broadcast message, and to implement a repeater solution.

The method is however not solely useful during the initialization phase when a WPAN is set up, but is also useful when further devices are introduced to the WPAN. Accordingly, in case the WPAN preferably comprises an additional third coordinator, the third coordinator operating at a third channel frequency, each of the first and the second coordinators are preferably adapted to independently of each other perform the steps of transmitting a message at a plurality of channel frequencies including the third channel frequency, requesting the third coordinator to change from the third channel frequency to the first channel frequency, and communicating with the third coordinator using the first channel frequency. That is, each of the first and the second coordinator can independently of each other provide such that the third coordinator transition to the channel frequency of the first coordinator, thereby allowing the possibility to communicate at a single channel frequency. As discussed above, this increases the available bandwidth and optimizes the energy efficiency of the WPAN.

Furthermore, the method according to the present invention is not limited solely to the first coordinator. Accordingly, corresponding method steps may thus be executed in the second (or third) coordinator comprised in the WPAN, wherein the second coordinator operates at a second channel frequency and the WPAN further comprises a first coordinator operating a first channel frequency. From the perspective of the second (or third) coordinator, the method thus comprises the steps of receiving a message from the first coordinator, receiving a request from the first coordinator to change from the second channel frequency to the first channel frequency, and communicating with the first coordinator using the first channel frequency. These steps can of course also be executed by the first coordinator if for example the second coordinator initiates the communication.

According to a preferred embodiment of the invention, the request to change to the first channel frequency is provided as a separate message (or signal) when the first coordinator receives a response from the second coordinator.

According to another preferred embodiment of the invention, the request to change to the first channel frequency is embedded in the message. That is, preferably the at least one of the messages is a packet type message comprising a header holding information regarding the channel frequency of the first coordinator, for example by including at least two channel frequency specific bits in the header. With two channel frequency bits a max of four different channel frequencies can be communicated. However, one or more than two bits can of course be dedicated to the information regarding the channel frequency. Thus, the channel frequency preferred by the first coordinator will be communicated (e.g. embedded) in the header, wherein the header preferably is a network header, but possibly can be any type of header. Other type of common headers are PHY headers, MAC headers, transport headers, etc.

In addition, the step of transmitting a message at a plurality of channel frequency preferably comprises the use of frequency agility or also commonly referred to as dynamic channel/frequency selection. Frequency agility, or the use of the frequency agility mechanism as will be further discussed below, includes the periodic change of transmission frequency or the change between a plurality of predefined channel frequencies. The use of frequency agility is also used to avoid interference from a known interferer or other signal source, for example conflicting WPAN's in the surrounding of the coordinator of interest. In for example a home, it is likely that multiple types of wireless networks vying for the same frequency bands, as well as unintentional interference from appliances. Thus, the ability to relocate within the spectrum will be an important factor in network success.

Preferably, the communication between the control unit and the device is provided by means radio frequency (RF) communication, and most preferably is the RF communication based at least one of the IEEE 802.15.3 or the IEEE 802.15.4 standard. Generally, when implementing an IEEE 802.15.3 or the IEEE 802.15.4 WPAN, the basic network topology will be in the form of a basic star, where a WPAN can consist of interconnected stars. Furthermore, depending on the network technology used, there are a different number of channel frequencies available. For example, when using IEEE 802.15.4, there are a total of 16 channel frequencies available in the United States, but only a subset of these channels will be used for frequency agility, since otherwise the latency will become too large to cope with. Therefore, a practical number of channel frequencies for use with the IEEE 802.15.4 technology are three or four.

According to a further aspect of the invention, there is provided a first coordinator for use in a WPAN, the first coordinator operating at a first channel frequency and comprising means for transmitting a message at a plurality of channel frequencies including the second channel frequency, means for requesting the second coordinator to change from the second channel frequency to the first channel frequency, and means for communicating with the second coordinator using the first channel frequency.

This aspect of the invention provides similar advantages as according to the above discussed method, including e.g. the fact that no priority-based mechanism is needed, and that every coordinator that sets up a communication is able to have the coordinator it wants to communicate to change to its frequency. Another advantage with the present invention is that it will be possible to easily transmit a broadcast message, and to implement a repeater solution.

The coordinator is preferably a consumer electronic device (CED) such as at least one of a television set (TV), a Digital Versatile Disc player (DVD), a Home Theatre System (HTS), and a wireless remote control (RC).

Additionally, the above-mentioned and other objects of the present invention may be achieved through a computer program adapted to run on a coordinator (e.g. a first, second or third coordinator) according to the present invention.

BRIEF DESCRIPTION OF THE DRAWINGS

These and other aspects of the present invention will now be described in more detail, with reference to the appended drawings showing currently preferred embodiments of the invention, in which:

FIG. 3 is a timing diagram illustrating an example of the stepwise transition to a single/optimal channel frequency in accordance with the present invention.

DETAILED DESCRIPTION OF CURRENTLY PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee.

Figure 1:
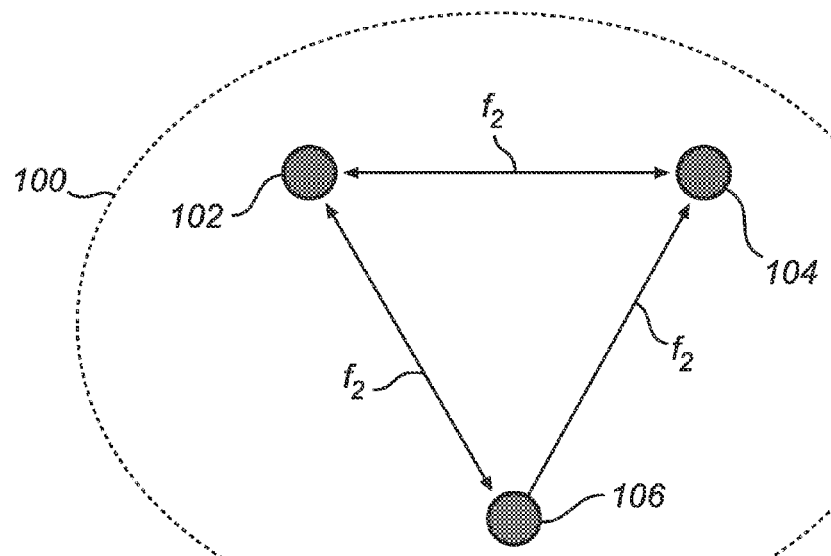
FIG. 1 is a WPAN comprising a plurality of coordinators operating according to a prior art network topology set-up.

Referring now to the drawings and to FIG. 1 in particular, there is depicted a prior art WPAN 100 comprising a plurality of coordinators or coordinator-capable devices 102, 104 and 106 each having a separate WPAN ID (or other suitable network identifier) and set to communicate on a separate channel frequency, e.g. a first f1, a second f2 and a third f3 channel frequency, respectively, wherein the coordinators 102, 104 and 106 are set-up as a slave-based non-cooperative network.

As discussed above, the coordinators are preferably consumer electronic devices (CEDs) such as for example a television set (TV), a Digital Versatile Disc player (DVD) and a Home Theatre System (HTS). According to the prior art WPAN 100 as shown in FIG. 1, the coordinator-capable device that starts communication, will use the WPAN ID and channel frequency of the device it wants to talk to, instead of its own WPAN ID and channel frequency, and thus if one of the coordinators 102, 104 or 106 wants to control one of the other devices it will have to switch from one channel frequency to the next.

If the coordinator 102 of the prior art WPAN 100 during operation wants to communicate with the coordinator 104 it will have to move to the channel frequency of the coordinator 104, i.e. transition from the first channel frequency f1 to the second channel frequency f2. At that moment, it is not possible for the coordinator 106 to address the coordinator 102, since for a certain amount of time the coordinator 102 will not be able to receive communication from the coordinator 106. That is, the coordinator 102 will more or less be deaf for communication from the coordinator 106. Because of the slave-based non-cooperative network topology used by the prior art WPAN 100, the frequency agility mechanism will be more frequently addressed, increasing latency and leading to extra network traffic. Similarly, if the coordinator 102 wants to communicate with the coordinator 106 it will have to switch to the channel frequency of the coordinator 106 (i.e. the third channel frequency f3), and it will not be possible to communicate with the coordinator 104 at the same time, i.e. the coordinator 102 will in a similar manner be deaf to communication from the coordinator 104. Consequently, all the devices 102, 104 and 106 will communicate with each other at different channel frequencies.

Thus, the prior art network topology used by the WPAN 100 will not provide any mechanism to migrate to single channel frequency, and the coordinator 102 can only reside to Energy Detection (ED) scanning and possibly bad checksum (CRC) information for activating a change of channel frequency. In addition, broadcast messages will not be possible and/or useful, and a repeater implementation (i.e. a device having repeater functionality) will not work in the above-discussed non-cooperative network.

Figure 2:
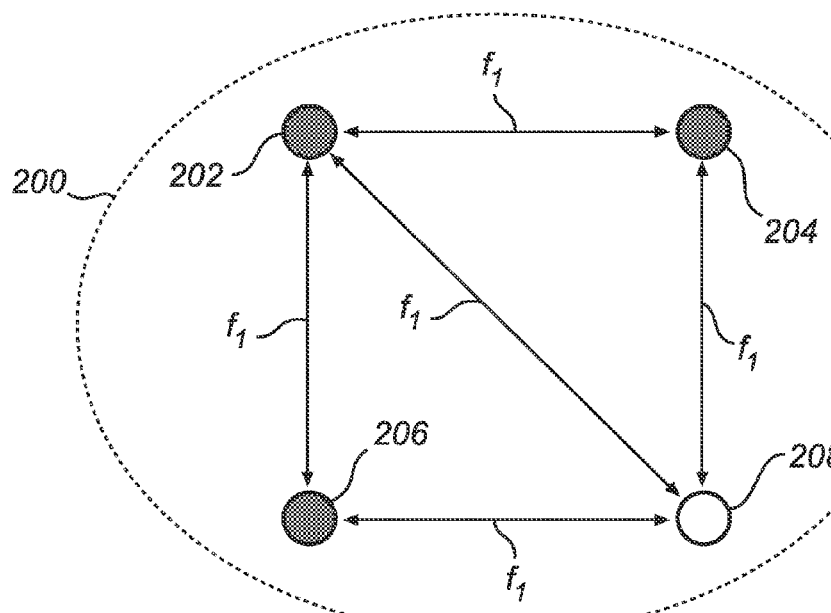
FIG. 2 is a similar WPAN as in FIG. 1 operating according to a network topology set-up according to the present invention.

In accordance with the present invention an implementation is illustrated in FIG. 2, wherein a WPAN 200 similar to the WPAN 100 in FIG. 1 is shown. However, the WPAN 200 in FIG. 2 additionally to three coordinators 202, 204 and 206 comprises a wireless multifunction remote control (M_RC) 208 which is provided for controlling the functionality of the different coordinators, the multifunction remote control itself will typically not have coordinator capabilities, but still it is possible to have a multifunction remote control that has coordinator capabilities. A non-coordinator capable device will act according to the prior art. As discussed above, the coordinators are preferably consumer electronic devices (CEDs) such as for example a television set (TV), a Digital Versatile Disc player (DVD) and a Home Theatre System (HTS), or any other similar device used in the home environment. It is however understood that other present and future devices suitable for use in connection to a WPAN may be considered in relation to the present invention.

As in relation to the WPAN 100, the coordinators 202, 204 and 206 (e.g. first, second and third coordinators respectively) all have a separate WPAN ID, thus each residing on a separate channel frequency, e.g. a first f1, a second f2 and a third f3 channel frequency, respectively. Also similar to the WPAN 100 of FIG. 1, if a coordinator, for example the first coordinator 202, wants to communicate with another coordinator, for example the second coordinator 204, the first coordinator 202 will use frequency agility mechanism to find the coordinator 204 (e.g. by means of subsequently scanning different channel frequencies such as the first f1, the second f2 and the third f3 channel frequencies). When the first coordinator 202 has found the second coordinator 204, it communicates the channel frequency it is operating at, and on receiving this message the coordinator 204 sends an acknowledgement on the channel on which the message was received and then switches to the frequency channel of the coordinator that initiated the communication (i.e. coordinator 202). The advantage with the present invention however further increases when additional coordinators are provided to communicate with each other.

For example, as just discussed, if the first coordinator 202 wants to communicate with the second coordinator 204 it will request the second coordinator 204 to transition to the preferred channel frequency of the coordinator 202, i.e. the first channel frequency f1. If then the first coordinator 202 wants to communicate with the third coordinator 206 (or if the second coordinator 204 wants to communicate with the third coordinator 206) it will have the coordinator 206 to move to the channel frequency of the coordinator 202 as well, i.e. a transition from the third channel frequency f3 to the first channel frequency f1. Similarly, if the wireless multifunction remote control 208 is in communication with the different coordinators 202, 204 and 206, the multifunction remote control 208 will transition to the channel frequency of the coordinator that initiated the initial communication, which in this case will be the first coordinator 202. Consequently, all the devices 202, 204, 206 and 208 will communicate on the channel frequency (i.e. the first channel frequency f1) of the first coordinator 202.

If however an interference source would be introduced in the close surrounding of the WPAN 200 and the current operating channel frequency becomes compromised, any one of the coordinators 202, 204 or 206 may individually decide to move to a different channel frequency, without informing the other coordinators. Since the coordinators are expected to work in the same vicinity it would be expected that all other coordinators also detect the interference source and would on an individual basis switch. If some of the devices switch and others do not then the same mechanism as provided above will again be used to facilitate communication across coordinator and non-coordinator capable devices. Another, approach would be to broadcast a channel change message on changing channel.

Turning now to FIG. 3 illustrating a timing diagram of the coordinators 202, 204 and 206, and the remote control 208, transitioning from individual channel frequencies, i.e. the first f1, the second f2, and the third f3 channel frequencies, to an optimized single channel frequency to for communication between the devices 202, 204, 206 and 208.

In the timing diagram, the process starts with the first coordinator 202, e.g. a TV, initiating communication with a second coordinator 204, e.g. a DVD. The TV 202 uses frequency agility to find the DVD 204. A first, second and third position 302, 304 and 306 marks where the TV 202 sequentially transmits at a first f1, a second f2 and a third f3 channel frequency in its pursuit to find the DVD 204.

At the position 308, the TV 202 finds the DVD 204, and communicates its operating (or preferred) channel frequency, i.e. the first channel frequency f1, and the DVD 204 switches to the TV's 202 channel frequency, i.e. the first channel frequency f1.

Subsequently at position 310, the wireless multifunction remote control 208 initiates communication with the DVD 204. Similarly, the multifunction remote control 208 uses frequency agility to find DVD 204 (indicated by means of positions 310, 312 and 314). The multifunction remote control 208 then, at position 316, adopts the TV's 202 channel frequency, i.e. the first channel frequency f1, as the DVD 204 has inherited the channel frequency (i.e. channel frequency f1) of the TV 202.

At position 318, the DVD 204 initiates communication with the third coordinator, such as for example a HTS 206. Again, the DVD 204 uses frequency agility to find the HTS 206 (indicated by means of positions 318, 320 and 322). The HTS 206 the adopts, at position 324, the DVD's 204 channel frequency, and transition to the first channel frequency f1.

At position 326, the TV 202 initiates communication with the HTS 206. Again the TV 202 use frequency agility to find the HTS 206 (indicated by means of positions 326, 328 and 330). When the TV 202 finds the HTS 206 it communicates its channel frequency, i.e. the first channel frequency f1 to the HTS 206 at position 332, and the HTS 206 then switches to the TV's 202 channel frequency, i.e. the first channel frequency f1. In this example the HTS is already on f1 of the TV through the steps of the previous paragraph. Therefore this specific sequence is not required.

Additionally, at position 334, the multifunction remote control 208 tries to communicate with the HTS 206. Similarly, the multifunction remote control 208 will use the frequency agility mechanism to find (as indicated by means of position 334, 336 and 338) which channel frequency the HTS 206 is communicating at. The multifunction remote control 208 will then, at position 340, adopt the first channel frequency f1 for the communication with the HTS 206. Thus, at this point, all the devices 202, 204, 206 and 208 will have transitioned to the channel frequency of the TV 202 (i.e. the first channel frequency f1) and thus an optimized single transmission frequency will be used to for communication between the devices. Indeed, the remote control will start to communicate on the channel frequency the HTS was originally on. The remote control will have to use frequency agility reacquisition mechanism to find the HTS and accordingly adopt the new frequency. This only applies to non-coordinator capable devices, such as remote controls.

Furthermore, the skilled addressee realizes that the present invention by no means is limited to the preferred embodiments described above. On the contrary, the skilled addressee understands that many modifications and variations are possible within the scope of the appended claims. For example, the number of coordinators and non-coordinators is a variable and can be increased and decreased as necessary. Furthermore, the frequency agility mechanism can be made more efficient by storing the RF channel on which another device is expected to operate. When a device wishes to communicate to another device, it first consults this information and tries to communicate with the other device on the said expected channel. If this fails, a full channel frequency agility mechanism can be applied.

In conclusion, it is according to the present invention possible to provide a novel method for a first coordinator operating at a first channel frequency in a WPAN, the WPAN further comprising a second coordinator operating a second channel frequency, the method comprising the steps of transmitting a message at a plurality of channel frequencies including the second channel frequency, requesting the second coordinator to change from the second channel frequency to the first channel frequency, and communicating with the second coordinator using the first channel frequency. As discussed above, advantages with the present invention includes that no priority based mechanism is needed due to the fact that the coordinator that initiates (e.g. starts) communication decides on used frequency. Furthermore, every coordinator is able to have the coordinator it wants to communicate with to change to its decided frequency.

The invention claimed is:

1. Method for a first coordinator operating at a first channel frequency in a wireless personal area network (WPAN), the WPAN further comprising a second coordinator operating a second channel frequency, the method comprising the steps of:
   initiating a communication from the first coordinator to locate said second coordinator in said WPAN by scanning a plurality of channel frequencies including the second channel frequency,
   transmitting a first message from the first coordinator to the located second coordinator on the second channel frequency, informing the second coordinator that the first coordinator is operating at the first channel frequency,
   receiving a response message from the second coordinator on the second channel frequency acknowledge the first message transmitted from the first coordinator,
   transmitting a second message from the first coordinator to the second coordinator on the second channel frequency requesting that the second coordinator change from the second channel frequency to the first channel frequency,
   communication between the first coordinator and the second coordinator using the first channel frequency of the first coordinator, and
   wherein at least one of the first and second messages is a packet type message comprising a header holding information regarding the channel frequency of the first coordinator.

2. Method according to claim 1, wherein the WPAN further comprises a third coordinator, the third coordinator operating at a third channel frequency, and each of the first and the second coordinators are adapted to perform the steps of:
   initiating a communication from the first and second coordinators to locate said third coordinator in said WPAN by scanning a plurality of channel frequencies including the third channel frequency,
   transmitting a first message from the first and second coordinators to the located third coordinator on the third channel frequency, informing the third coordinator that the first and second coordinators are operating at the first channel frequency,
   receiving a response message from the third coordinator on the third channel frequency acknowledging the first message transmitted from the first and second coordinators,
   transmitting a second message from the first and second coordinators to the third coordinator on the third channel frequency requesting that the third coordinator change from the third channel frequency to the first channel frequency,
   communicating between the first, second and third coordinators using the first channel frequency of the first and second coordinators.

3. Method for a second coordinator operating at a second channel frequency in a wireless personal area network (WPAN), the WPAN further comprising a first coordinator operating a first channel frequency, the method comprising the steps of:
   Receiving a first message from the first coordinator informing the second coordinator that the first coordinator is operating on the first frequency channel,
   transmitting a response message from the second coordinator on the second channel frequency acknowledging the first message,
   receiving, a second message, from the first coordinator at the second channel frequency requesting that the second coordinator change from the second channel frequency to the first channel frequency of the first coordinator,
   communicating with the first coordinator using the first channel frequency, and wherein at least one of the first and second messages is a packet type message comprising a header holding information regarding the channel frequency of the first coordinator.

4. Method according to claim 1, wherein the request to change to the first channel frequency is embedded in the first message and the second message is not transmitted.

5. Method according to claim 1, wherein the step of scanning a plurality of channel frequencies comprises the use of frequency agility.

6. Method according to claim 1, wherein the communication between the coordinators are provided by means radio frequency (RF) communication.

7. Method according to claim 1, wherein the RF communication is based on at least one of the IEEE 802.15.3 or the IEEE 802.15.4 standard.

8. First coordinator for use in a wireless personal area network (WPAN), the first coordinator operating at a first channel frequency and comprising:
means for initiating a communication to locate said second coordinator in said WPAN, comprising scanning a plurality of channel frequencies in said WPAN including the second channel frequency of operation of the second coordinator,
means for locating the second coordinator in said WPAN at said second channel frequency of operation based on said scan,
means for transmitting a first message to the second coordinator on the second channel frequency, informing the second coordinator that the first coordinator is operating on the first channel frequency,
means for receiving a response message from the second coordinator on the second channel frequency acknowledging the first message transmitted from the first coordinator,
means for transmitting a second message to the second coordinator on the second channel frequency requesting that the second coordinator change from the second channel frequency of operation of the second coordinator to the first channel frequency of the first coordinator,
means for communicating between the first coordinator and the second coordinator using the first channel frequency of the first coordinator, and
wherein at least one of the first and second messages is a packet type message comprising a header holding information regarding the channel frequency of the first coordinator.

9. Second coordinator for use in a wireless personal area network (WPAN), the second coordinator operating at a second channel frequency and comprising:
Means for receiving a first message from the first coordinator informing the second coordinator that the first coordinator is operating on the first frequency channel;
means for transmitting a response message from the second coordinator on the second channel frequency acknowledging the first message,
means for receiving a second message from the first coordinator to the second coordinator on the second channel frequency requesting that the second coordinator change from the second channel frequency of operation of the second coordinator to the first channel frequency of the first coordinator, and
wherein at least one of the first and second messages is a packet type message comprising a header holding information regarding the channel frequency of the first coordinator.

10. Coordinator according to claim 8, wherein at least one of the first and the second coordinator is a consumer electronic device (CED) such as at least one of a television set (TV), a Digital Versatile Disc player (DVD), a Home Theatre System (FITS), and a wireless remote control.

11. Wireless personal area network (WPAN), comprising a first coordinator operating at a first channel frequency in a wireless personal area network (WPAN), the WPAN further comprising a second coordinator operating at a second channel frequency, and a third coordinator operating at a third channel frequency, the method comprising the steps of:
initiating a communication from the first coordinator to locate said second coordinator in said WPAN by scanning a plurality of channel frequencies,
locating the second coordinator in said WPAN at said second channel frequency of operation based on said scan,
transmitting a first message from the first coordinator to the second coordinator on the second channel frequency, informing the second coordinator that the first coordinator is operating on the first channel frequency,
receiving a response message from the second coordinator on the second channel frequency acknowledging the first message transmitted from the first coordinator,
transmitting a second message from the first coordinator to the second coordinator on the second channel frequency requesting that the second coordinator change from the second channel frequency of operation to the first channel frequency of the first coordinator,
initiating a communication from one of the first and second coordinators to locate said third coordinator in said WPAN, comprising scanning a plurality of channel frequencies in said WPAN including the third channel frequency of operation of the third coordinator,
locating the third coordinator in said WPAN at said third channel frequency of operation based on said scan,
transmitting a third message from one of the first and second coordinators to the third coordinator on the third channel frequency, informing the third coordinator that the first and second coordinators are operating on the first channel frequency,
receiving a response message from the third coordinator on the third channel frequency acknowledging the first message transmitted from the first and second coordinators,
transmitting a fourth message from one of the first and second coordinators to the third coordinator on the third channel frequency requesting that the third coordinator change from the third channel frequency of operation of the third coordinator to the first channel frequency of the first and second coordinators,
communicating between the first, second and third coordinators using the first channel frequency of the first and second coordinators.

12. A non-transitory computer storage medium comprising computer program code stored on a computer-readable medium for performing a method for a first coordinator operating at a first channel frequency in a wireless personal area network (WPAN), the WPAN further comprising a second coordinator operating a second channel frequency, and a third coordinator operating at a third channel frequency, the method comprising the steps of:
initiating a communication from the first coordinator to locate said second coordinator in said WPAN, comprising scanning a plurality of channel frequencies in said WPAN including the second channel frequency of operation of the second coordinator, locating the second coordinator in said WPAN at said second channel frequency of operation based on said scan, transmitting a first message from the first coordinator to the second coordinator on the second channel frequency, informing the second coordinator that the first coordinator is operating on the first channel frequency, receiving a response message from the second coordinator on the second channel frequency acknowledging the first message transmitted from the first coordinator, transmitting a second message from the first coordinator to the second coordinator on the second channel frequency requesting that the second coordinator change from the second channel frequency of operation of the second coordinator to the first channel frequency of the first coordinator, initiating a communication from one of the first and second coordinators to locate said third coordinator in said WPAN, comprising scanning a plurality of channel frequencies in said WPAN including the third channel frequency of operation of the third coordinator, locating the third coordinator in said WPAN at said third channel frequency of operation based on said scan, transmitting a third message from one of the first and second coordinators to the third coordinator on the third channel frequency, informing the third coordinator that the first and second coordinators are operating on the first channel frequency, receiving a response message from the third coordinator on the third channel frequency acknowledging the first message transmitted from the first and second coordinators, transmitting a fourth message from one of the first and second coordinators to the third coordinator on the third channel frequency requesting that the third coordinator change from the third channel frequency of operation of the third coordinator to the first channel frequency of the first and second coordinators, communicating between the first, second and third coordinators using the first channel frequency of the first and second coordinators, transmitting a message at a plurality of channel frequencies including the second channel frequency;

requesting the second coordinator to change from the second channel frequency to the first channel frequency; and communicating with the second coordinator using the first channel frequency when the program is executed in a coordinator according to claim 8.

13. A non-transitory computer storage medium comprising computer program code stored on a computer-readable medium when the program code is executed in a second coordinator for use in a wireless persona area network (WPAN), the second coordinator operating at a second channel frequency the program code comprising steps of:

receiving a first message from the first coordinator informing the second coordinator that the first coordinator is operating on the first frequency channel, transmitting a response message from the second coordinator on the second channel frequency acknowledging the first message, receiving a second message from the first coordinator to the second coordinator on the second frequency channel requesting that the second coordinator change from the second channel frequency of operation of the second coordinator to the first channel frequency of the first coordinator, communicating with the first coordinator using the first channel frequency, and wherein at least one of the first and second messages is a packet type message comprising a header holding information regarding the channel frequency of the first coordinator.

14. Method according to claim 1, wherein at least one of the first and the second coordinator is a consumer electronic device (CED) such as at least one of a television set (TV), a Digital Versatile Disc player (DVD), a Home Theatre System (HTS), and a wireless remote control.

* * * * *